United States Patent
Singh

(10) Patent No.: US 9,522,578 B1
(45) Date of Patent: Dec. 20, 2016

(54) ROBUST SYSTEM AND METHOD FOR AUTO-LOCATION OF TIRE-BASED SENSORS

(71) Applicant: The Goodyear Tire & Rubber Company, Akron, OH (US)

(72) Inventor: Kanwar Bharat Singh, Stow, OH (US)

(73) Assignee: The Goodyear Tire & Rubber Company, Akron, OH (US)

(*) Notice: Subject to any disclaimer, the term of this patent is extended or adjusted under 35 U.S.C. 154(b) by 0 days.

(21) Appl. No.: 14/938,145

(22) Filed: Nov. 11, 2015

(51) Int. Cl.
*B60C 23/06* (2006.01)
*B60C 23/04* (2006.01)
*G01M 17/02* (2006.01)

(52) U.S. Cl.
CPC ....... *B60C 23/0416* (2013.01); *B60C 23/0488* (2013.01); *G01M 17/02* (2013.01)

(58) Field of Classification Search
CPC ........ B60C 23/00; B60C 23/06; B60C 23/064; B60C 23/0488; B60C 23/0493; B60C 23/0415; B60C 23/0416
USPC ....... 340/442, 444, 445, 447; 73/146, 146.2, 73/146.5, 146.8; 701/1, 124
See application file for complete search history.

(56) References Cited

U.S. PATENT DOCUMENTS

| | | | | |
|---|---|---|---|---|
| 5,604,482 A | * | 2/1997 | Majeed | B60C 23/06 340/442 |
| 6,941,803 B2 | * | 9/2005 | Hirohama | B60C 23/0416 73/146.5 |
| 2014/0114558 A1 | * | 4/2014 | Singh | G01G 19/086 701/124 |
| 2014/0260585 A1 | * | 9/2014 | Singh | B60C 23/0488 73/146.3 |
| 2015/0239307 A1 | * | 8/2015 | Horikoshi | B60C 23/0479 340/442 |

* cited by examiner

*Primary Examiner* — Hung T Nguyen
(74) *Attorney, Agent, or Firm* — Edward T. Kennedy

(57) ABSTRACT

A tire sensor locating system for auto-location of a tire-based air pressure sensor at any tire location on a vehicle includes a hub acceleration sensor mounted to make a hub vertical acceleration measurement at a preset and known location on the vehicle for a respective one of the wheel hubs and a chassis acceleration sensor mounted to a chassis of the vehicle to make a chassis vertical acceleration measurement for the vehicle chassis. An estimator model is employed to derive a tire vertical stiffness estimation from the hub vertical acceleration measurements and the chassis vertical acceleration measurement. A look-up table correlates tire vertical stiffness estimation against measured tire air pressure and from the look-up table an assigned location of the tire sensor is made through a correlation between the tire measured air pressure and the tire vertical stiffness estimation.

19 Claims, 19 Drawing Sheets

Vertical Vibrational Characteristics of a Vehicle

16

Sprung Mass
(bounce frequency)

18

$$f_{ns} = \frac{1}{2\pi} \sqrt{\frac{\left(\frac{k_s k_t}{k_s + k_t}\right)}{M_s}} \quad \text{Spring in Series}$$

Un-sprung Mass
(wheel hop frequency)

$$f_{nu} = \frac{1}{2\pi} \sqrt{\frac{k_s + k_t}{M_u}} \quad \text{Spring in Parallel}$$

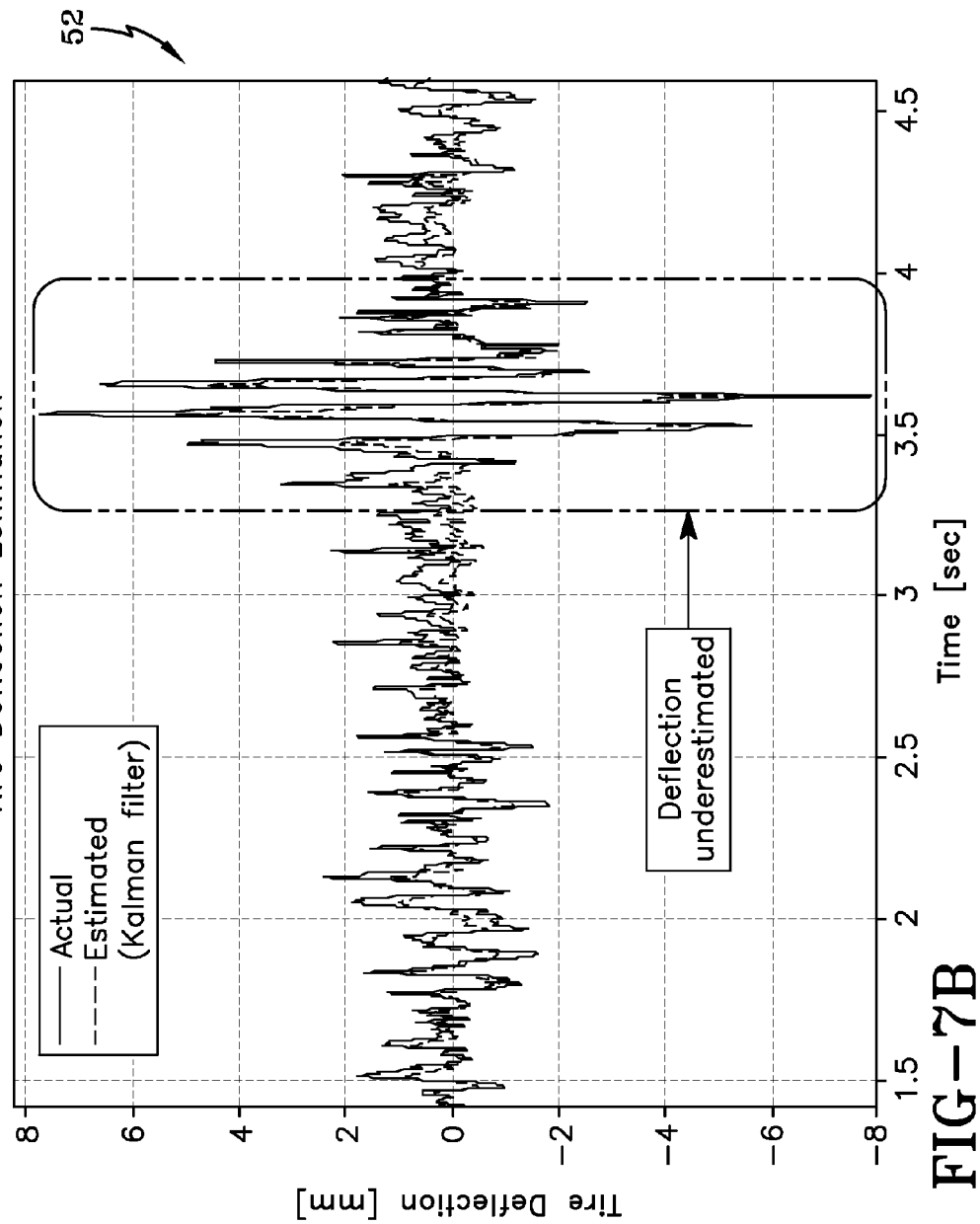

Get an updated estimate of the tire stiffness (Kt) at each new iteration of the system improving the overall observer performance Case 2: Initial guess lower than actual value 35 mph ated States Patent

ROBUST SYSTEM AND METHOD FOR AUTO-LOCATION OF TIRE-BASED SENSORS

FIELD OF THE INVENTION

The invention relates generally to tire monitoring systems for collecting measured tire parameter data during vehicle operation and, more particularly, to a system and method for location of tire-based sensors to a tire necessary to collection of such data.

BACKGROUND OF THE INVENTION

Attachment of pressure sensors to vehicle tires is intended to monitor the air pressure within vehicle tires. Typically each tire has a pressure sensor that transmits a pressure signal to a processor and the processor gives a low pressure warning to the vehicle operator when pressure of any given tire is below a preset threshold. It is desirable that such systems be capable of identifying the specific tire that is experiencing low air pressure rather than merely alerting the operator that one of the vehicle tires is low. Accordingly, there is a need for a system that can identify the location of tire-based sensors so that the specific tire experiencing low tire pressure may be ascertained.

SUMMARY OF THE INVENTION

According to one aspect of the invention, a tire sensor locating system for auto-location of a tire-based air pressure sensor at any tire location on a vehicle. A hub acceleration sensor is mounted to make a hub vertical acceleration measurement at a preset and known location on the vehicle for a respective one of the wheel hubs and a chassis acceleration sensor is mounted to a chassis of the vehicle to make a chassis vertical acceleration measurement for the vehicle chassis. An estimator model is employed to derive a tire vertical stiffness estimation from the hub vertical acceleration measurements and the chassis vertical acceleration measurement. A look-up table correlates tire vertical stiffness estimation against measured air pressure and from the look-up table an assigned location of the tire sensor is made through a correlation between the tire measured air pressure of the one tire and the tire vertical stiffness estimation of the one tire.

In another aspect of the invention, the look-up table correlates variation of tire vertical stiffness with inflation subject to a tire construction-specific identification and each of the vehicle tires carries a respective tire identification transponder to provide a coded tire identification used in the look-up table to make a tire construction specific correlation of tire vertical stiffnesses with air pressure.

According to a further aspect, the tire vertical stiffness estimation is made from a tire deflection observer using the hub vertical acceleration measurements and the chassis vertical acceleration measurement independently of any road surface variation.

A recursive least square parameter estimator is provided in another aspect of the invention to operate in parallel with the tire deflection observer to estimate the tire vertical stiffness in a robust and accurate manner.

DEFINITIONS

"ANN" or "Artificial Neural Network" is an adaptive tool for non-linear statistical data modeling that changes its structure based on external or internal information that flows through a network during a learning phase. ANN neural networks are non-linear statistical data modeling tools used to model complex relationships between inputs and outputs or to find patterns in data.

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"CAN-bus" is an abbreviation for controller area network.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact created by the tire tread with a flat surface as the tire rotates or rolls.

"Groove" means an elongated void area in a tire wall that may extend circumferentially or laterally about the tire wall. The "groove width" is equal to its average width over its length. A grooves is sized to accommodate an air tube as described.

"Inboard side" means the side of the tire nearest the vehicle when the tire is mounted on a wheel and the wheel is mounted on the vehicle.

"Kalman Filter" is a set of mathematical equations that implement a predictor-corrector type estimator that is optimal in the sense that it minimizes the estimated error covariance when some presumed conditions are met.

"Lateral" means an axial direction.

"Lateral edges" means a line tangent to the axially outermost tread contact patch or footprint as measured under normal load and tire inflation, the lines being parallel to the equatorial centerplane.

"Luenberger Observer" is a state observer or estimation model. A "state observer" is a system that provide an estimate of the internal state of a given real system, from measurements of the input and output of the real system. It is typically computer-implemented, and provides the basis of many practical applications.

"MSE" is an abbreviation for mean square error, the error between and a measured signal and an estimated signal which the Kalman filter minimizes.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Sensor" means a device mounted to a vehicle or to a tire for the purpose of measuring a specific vehicle or tire parameter and communicating the parameter measurement either wirelessly or via a vehicle CAN-bus for processing.

"PSD" is power spectral density (a technical name synonymous with FFT (fast fourier transform).

"RLS" is an abbreviation for "recursive least squares", an adaptive filter that recursively finds the coefficients that minimizes a weighted linear least squares function relating to the input signals.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which:

FIGS. 7A and 7B are graphs showing the effects of incorrect model parameters (i.e. tire stiffness) on the observer, assuming lower and higher stiffness than actual.

DETAILED DESCRIPTION OF THE INVENTION

The process of identifying which wheel module sent a particular signal and, therefore, which tire may have low pressure, is called localization. When a low pressure situation is detected, drivers generally want to know which tire is low rather than a general alert that one of the tires is low. A generalized warning requires a more time consuming action whereby each tire to be checked in order to determine which tire actually needs attention.

Effective and efficient localization is an on-going challenge in tire pressure monitoring systems (TPMS) because tires are frequently rotated and sometimes changed out between summer and winter, altering their positions on a vehicle. Additionally, power constraints on the wheel modules make frequent communications and localization of signal transmissions impractical.

Existing techniques to achieve signal "localization" include a low frequency (LF) transmitter installed in the vicinity of each wheel of the tire; a two-axis acceleration sensor or the like installed to recognize a rotation direction of the tire for left/right location determination of the tire; distinguishing front tires from rear tires by RF signal strength from the TPMS module; determining the position of a tire by using a relationship between anti-lock brake system (ABS) data and the tire's pressure measured by the TPMS module; using wheel radius analysis to monitor a change in the tire radius; and wheel spectrum analysis in monitoring a change in the wheel speed signal frequency spectrum such as monitoring the shift in the wheels first torsional frequency mode (25 to 140 Hz). Each of the aforementioned techniques has deficiencies that make location of a wheel on a vehicle either complex, expensive or susceptible to inaccuracies.

Figure 1:
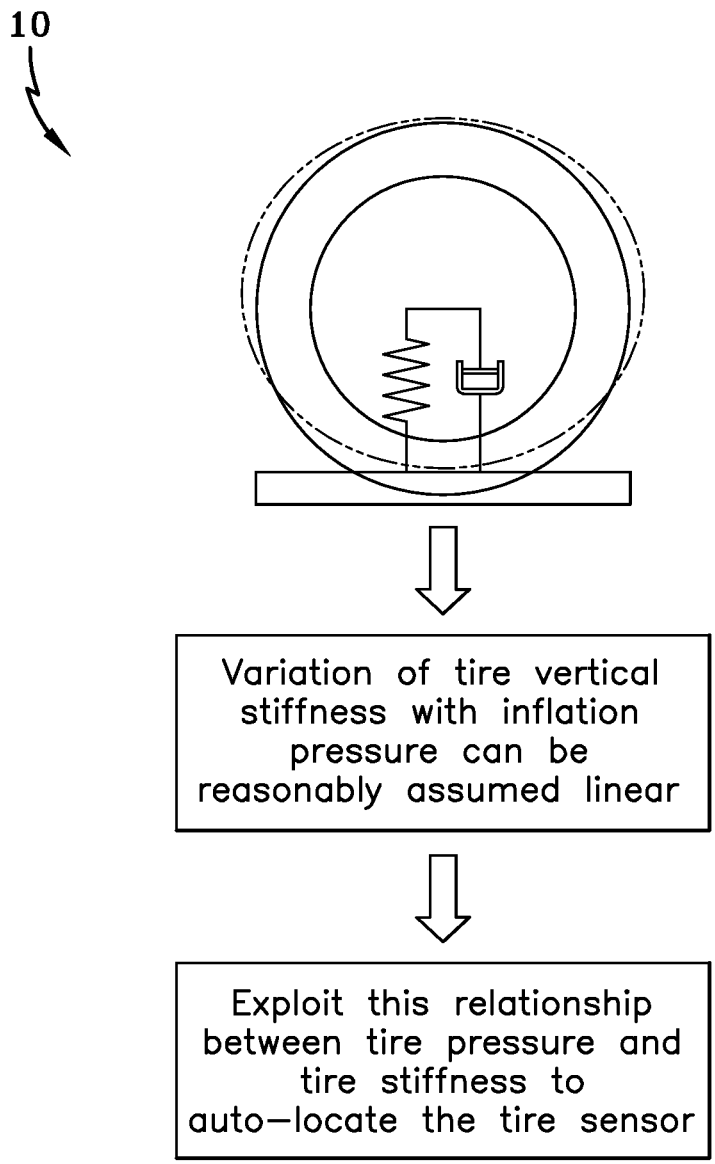
FIG. 1 is a diagram depicting how variation in tire's inflation pressure affects vertical stiffness.

Referring initially to FIG. 1 diagram 10, the subject system and method uses variation of tire vertical stiffness with inflation pressure as an instrument in locating the wheel on a vehicle. The relationship, reasonably assumed linear, may be exploited to auto-locate the tire pressure sensor without the use of additional sensors mounted to the vehicle chassis or tire or without the use of additional signal processing complexity. The sensitivity of vertical stiffness to tire air inflation pressure will be understood from the graph 12 of FIG. 2, using a first order model for spring-rate. The graph plots data points onto an ordinary least squares line and demonstrates the reasonably linear relationship between vertical stiffness and inflation pressure. A pressure loss of 20 percent relative to normal pressure is observed in graph 12 for a vertical stiffness change of 20 percent. The graph 12 was generated from tests run on a Goodyear Eagle F1 Asymmetric tire size 255/45R19.

Figure 3:
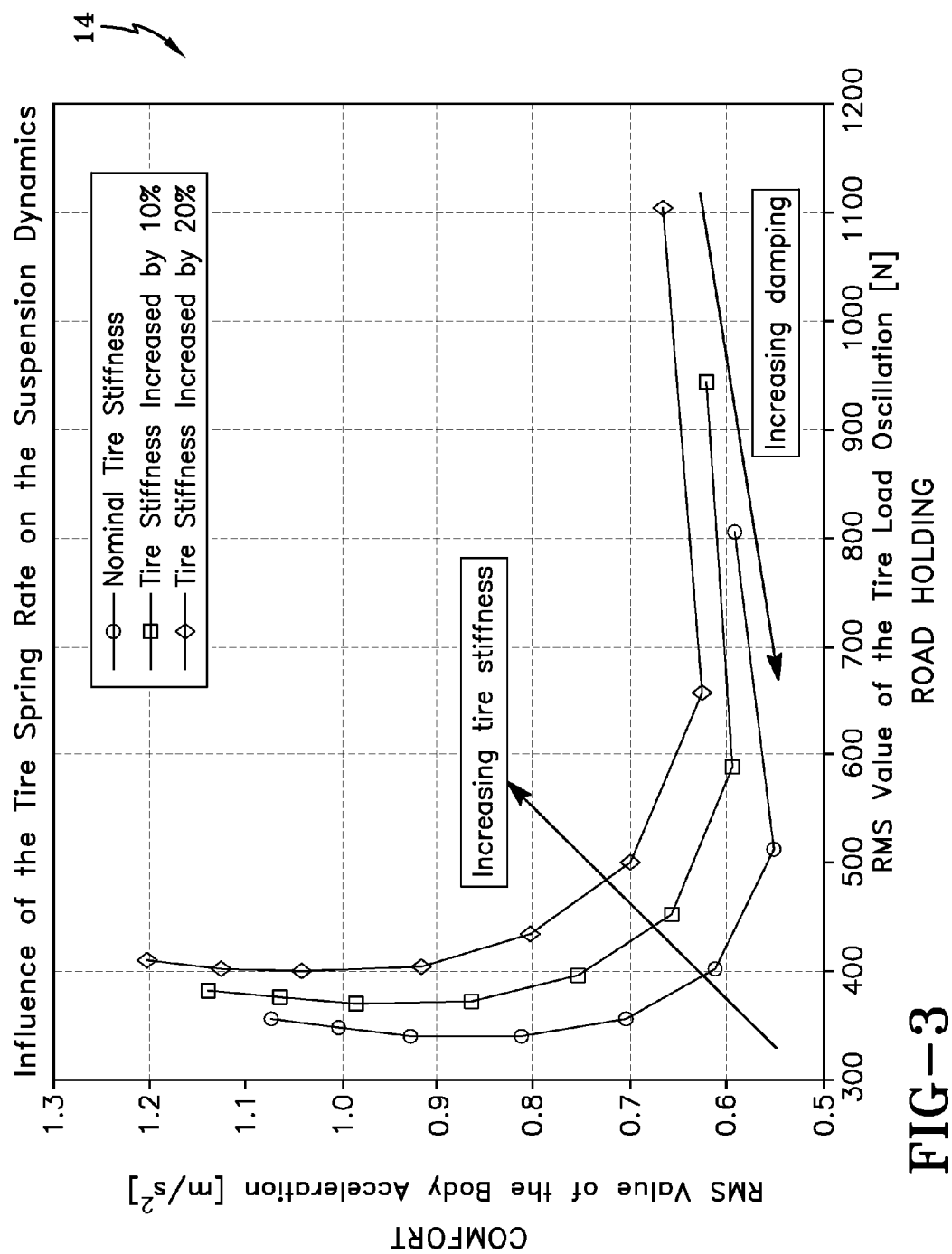
FIG. 3 is a graph of RMS of body acceleration to RMS of tire load oscillation showing influence of the tire spring rate on the suspension dynamics.

FIG. 3 is a diagram 14 that demonstrates the influence of the tire spring rate on the suspension dynamics. RMS value of the body acceleration is indicative of the "comfort" of the ride while root mean square (RMS) value of the tire load oscillation is indicative of road holding. The plots within the graph 14 are for nominal tire stiffness, tire stiffness increased by 10 percent and tire stiffness increased by 20 percent. The shift in the diagram through the three conditions shows the effect of increasing tire stiffness. From the diagram, it will be seen that, for a given suspension spring, better isolation of the sprung mass from road disturbances can be achieved with a soft (low) damping by allowing a larger suspension deflection. However, better road contact can be achieved with a hard (high) damping preventing unnecessary suspension deflections.

Figure 4A:
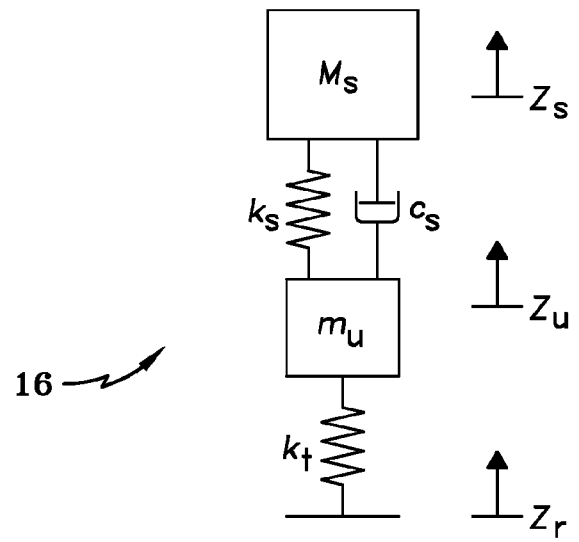
FIG. 4A is a model and algorithms therefore representing vertical vibrational characteristics of a vehicle.
Figure 4B:
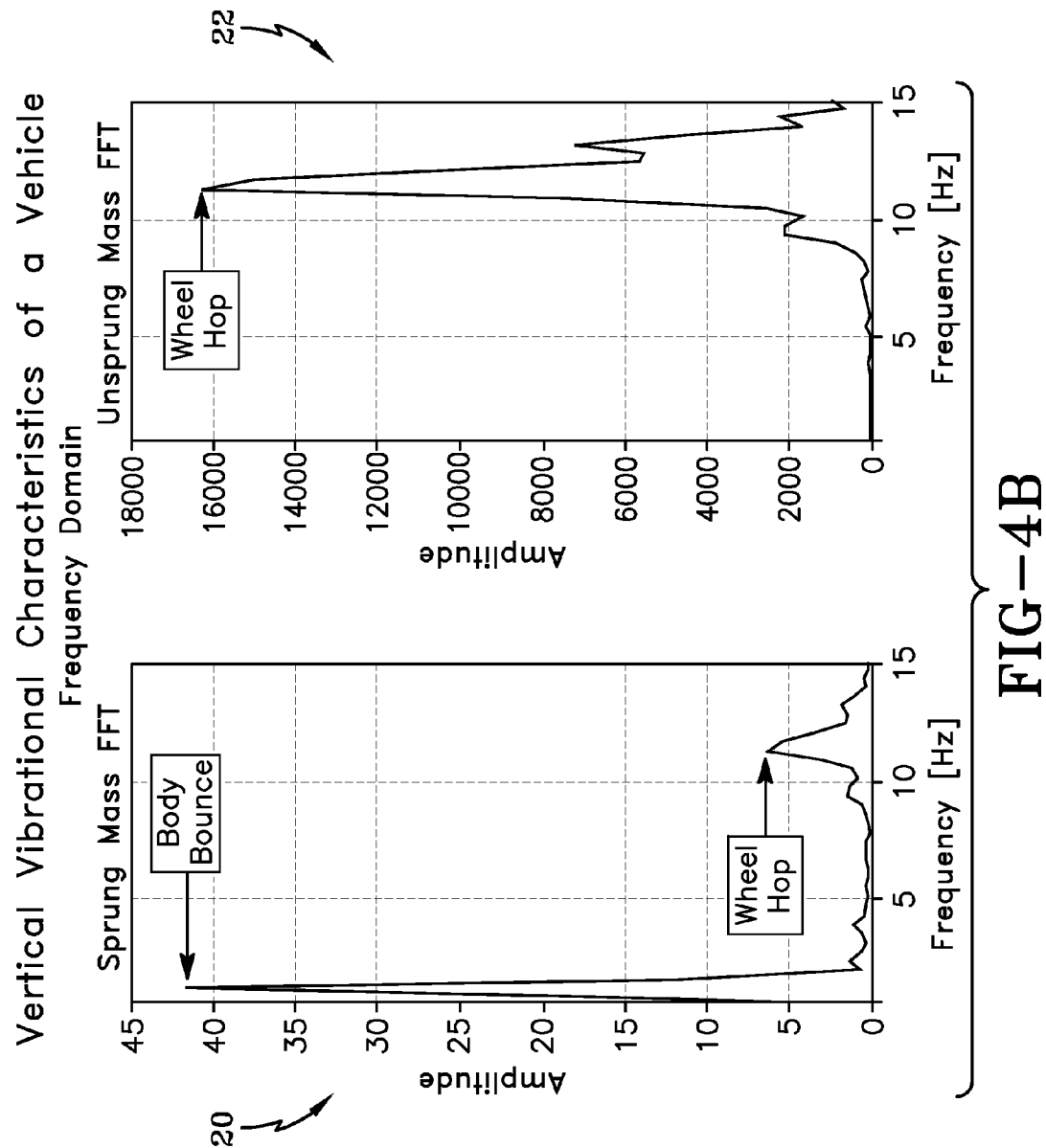
FIG. 4B are graphs of sprung mass and unsprung mass amplitude vs. frequency and showing body bounce and wheel hop occurrences.

In FIG. 4, vertical vibrational characteristics of a vehicle are shown from the suspension model 16 and equations 18. Sprung mass (bounce frequency) and un-sprung mass (wheel hop frequency) are derived by the equations 18 shown and are graphed in frequency domain in the graphs 20, 22 of FIG. 4B. Body bounce and wheel hop are identified for spring mass FFT in graph 20 and wheel hop in graph 22.

Figure 5A:
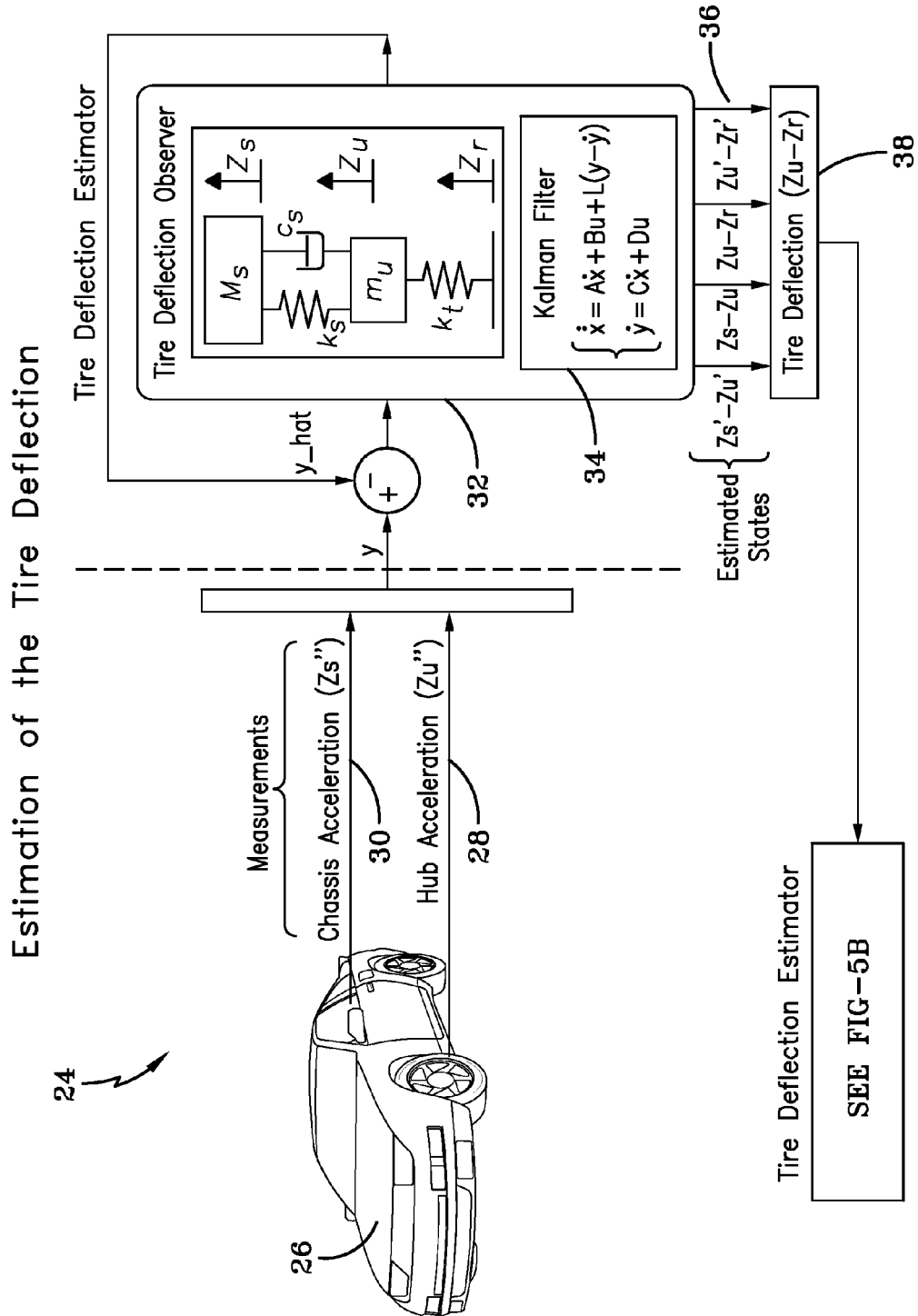
FIG. 5A is a schematic representation of a system for estimating tire deflection.
Figure 5B:
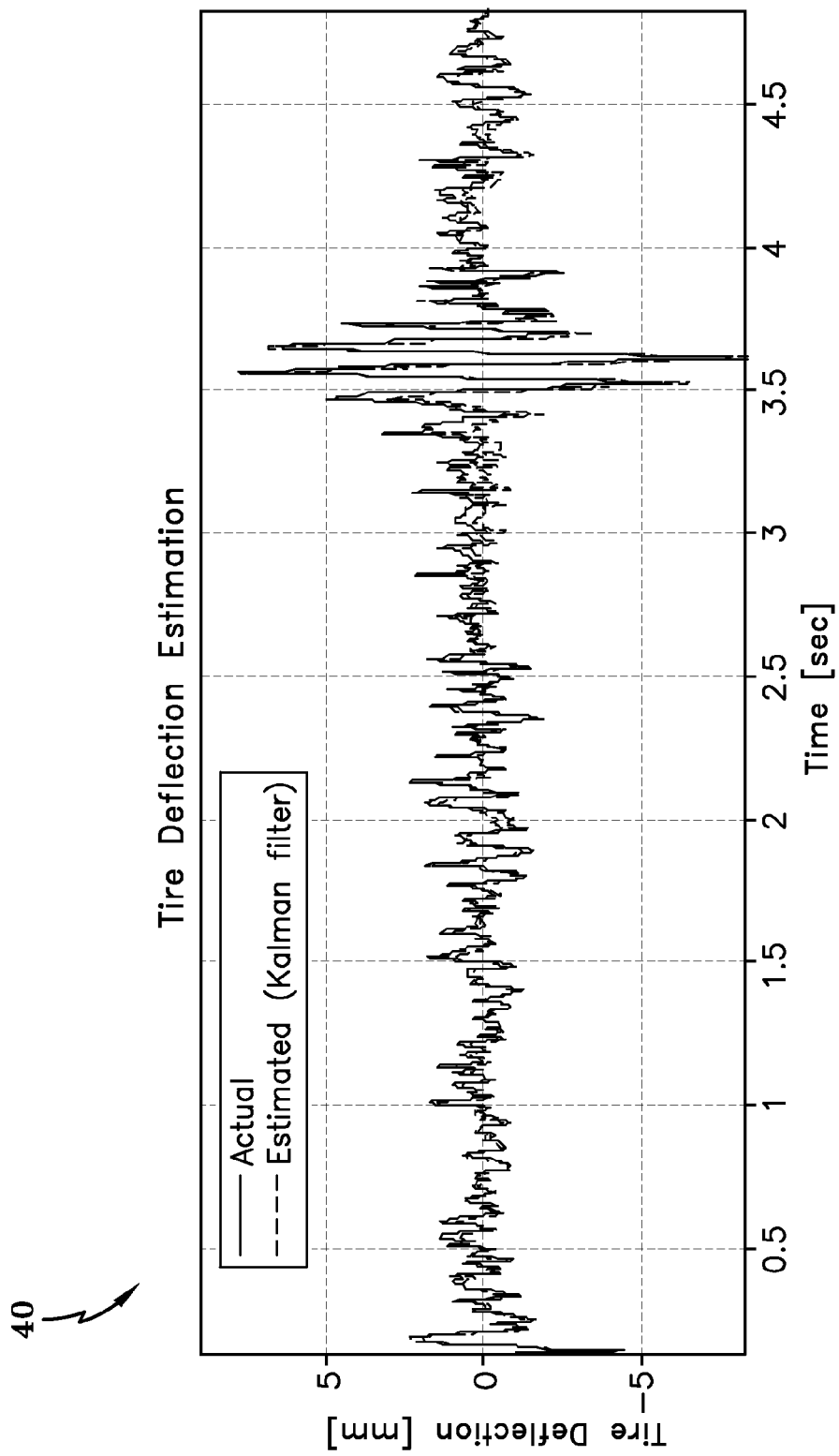
FIG. 5B is a graph of the tire deflection estimator comparing tire deflection actual vs. estimated (Kalman filter).

FIG. 5A shows a system 24 for estimation of the tire vertical deflection. A vehicle 26 is equipped with accelerometers for measuring chassis acceleration (Zs") 30 and hub acceleration (Zu") 28. The measured acceleration values are CAN-bus accessible by a tire deflection estimator consisting of a tire deflection observer 32 and a Kalman filter 34. The tire deflection observer model uses as required parameters: sprung mass, unsprung mass, suspension stiffness, suspension damping and tire stiffness. Estimated states 36 are outputs from the Kalman filter 34 and tire deflection (Zu-Zr) is derived from the estimated states 36. A tire deflection estimation is shown in the graph 40 of FIG. 5B using tire deflection from FIG. 5A and comparing actual against estimated values obtained from the Kalman filter. It will be noted from the above methodology that the tire vertical deflection has been reconstructed in a sufficiently accurate manner using chassis and hub mounted accelerometers with no knowledge of the road surface elevation.

Figure 6A:
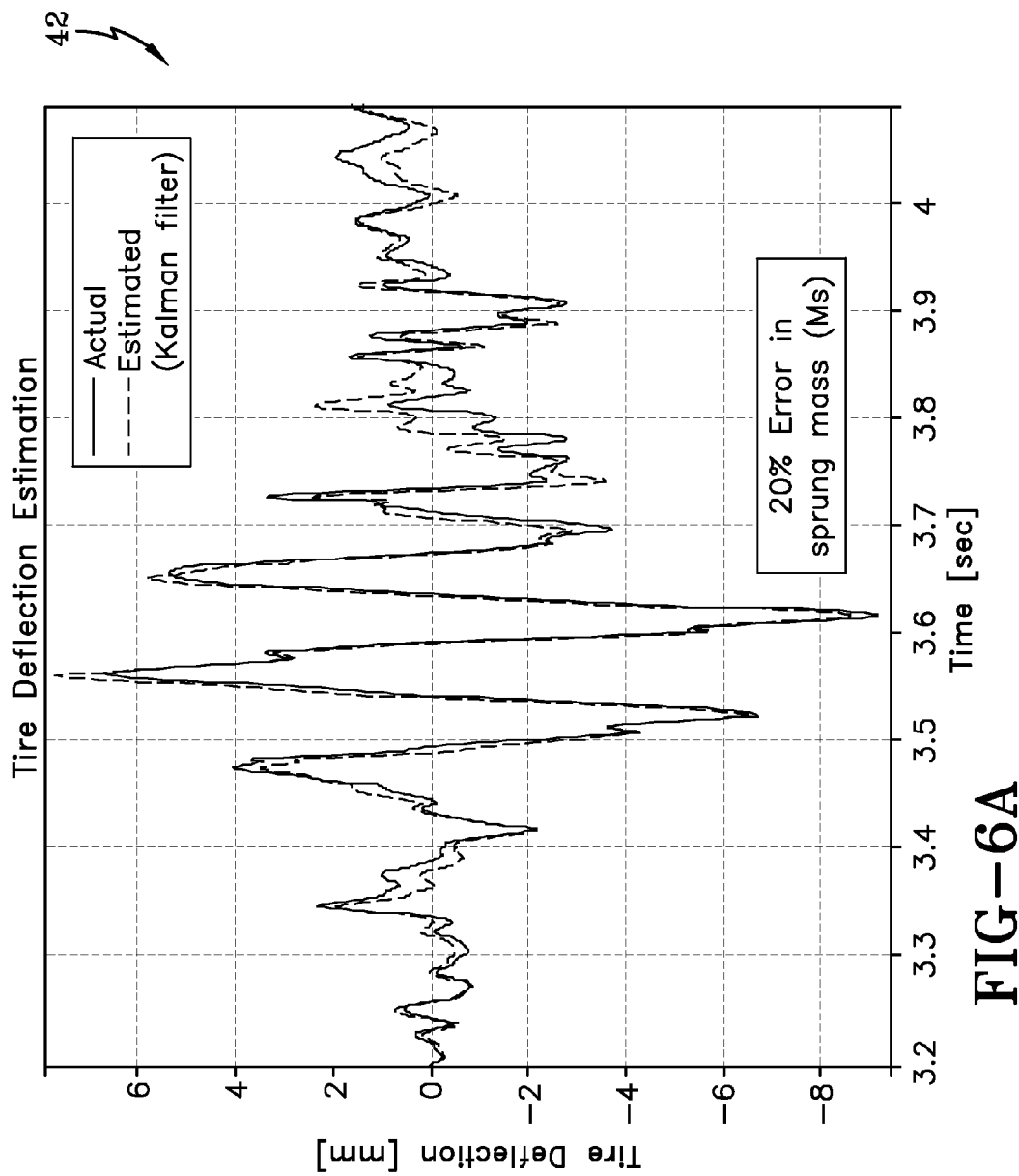
FIGS. 6A through 6D are graphs showing effects of incorrect model parameters on tire deflection estimation observer, graphing tire deflection over time for actual and estimated results.
Figure 6B:
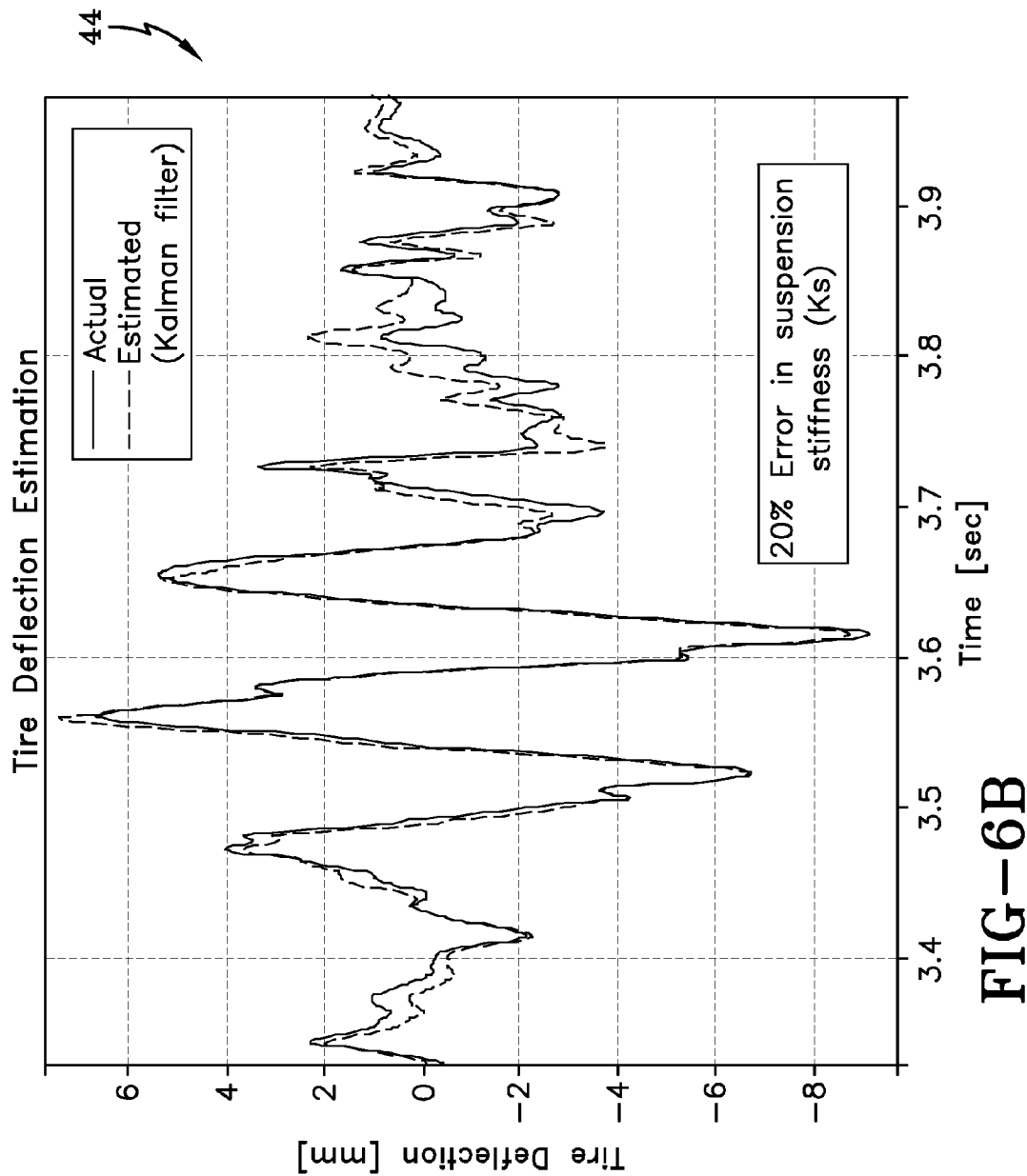
Figure 6C:
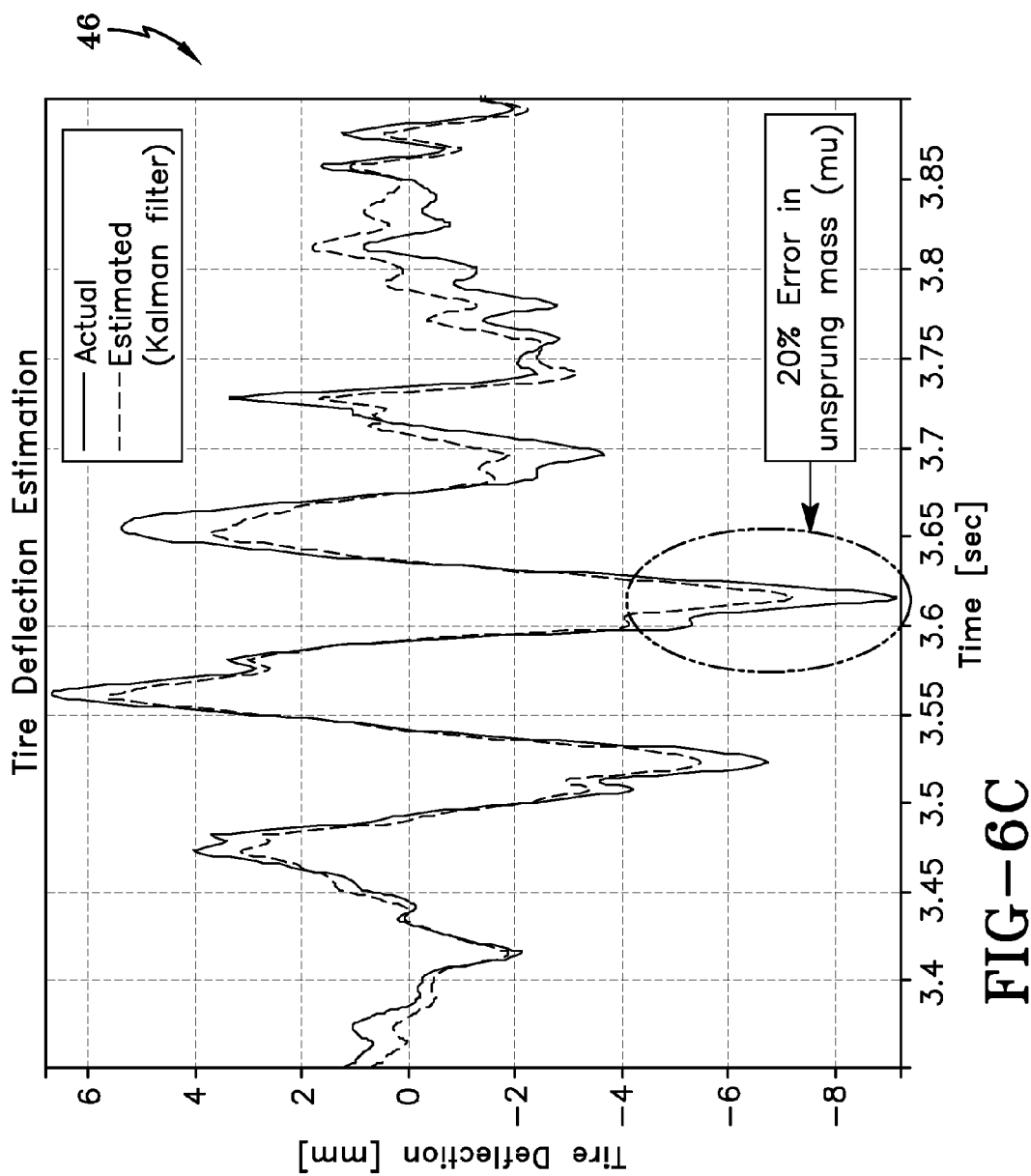
Figure 6D:
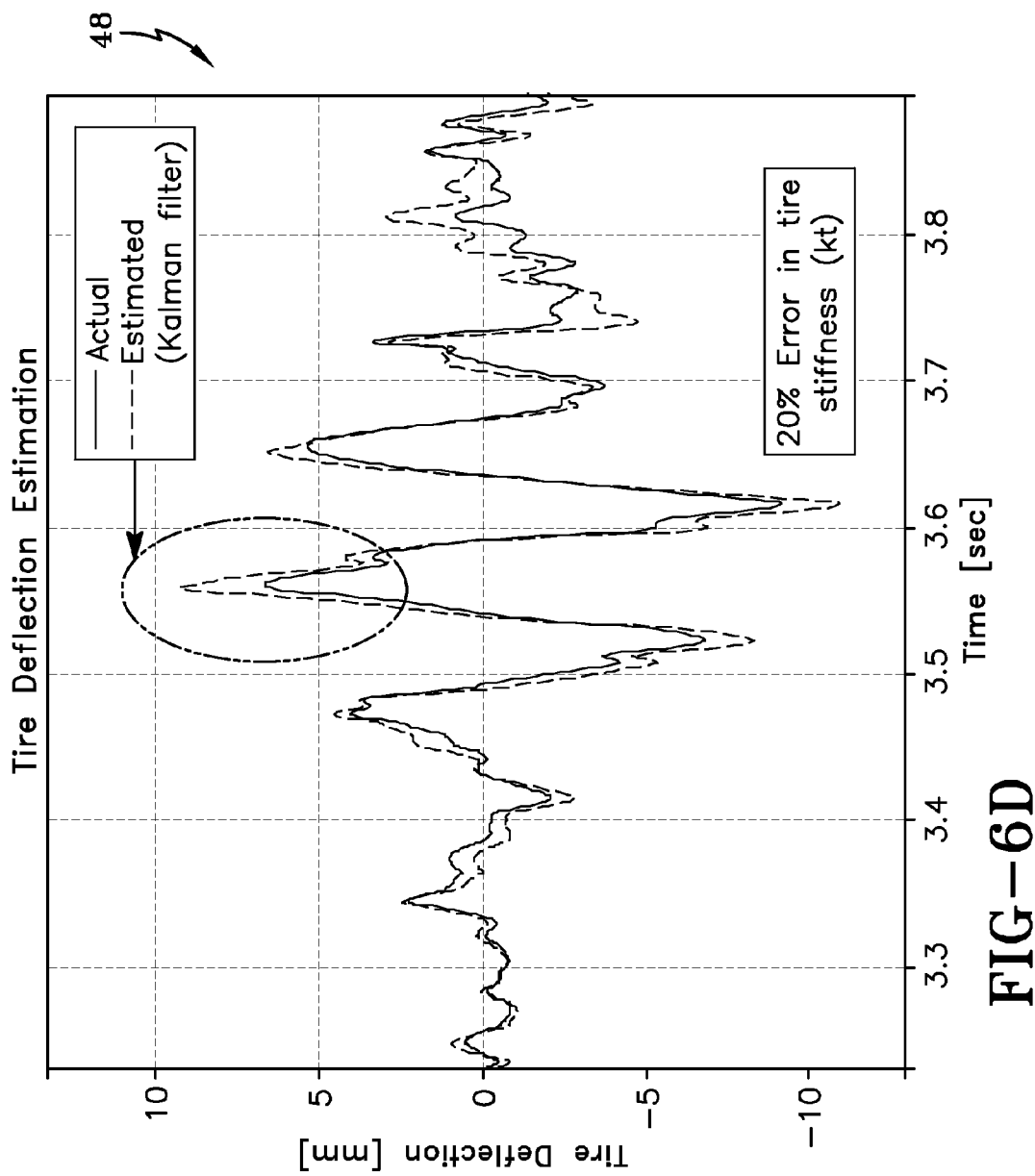

The effects of incorrect model parameters on the tire deflection estimation observer 32 will now be discussed with reference to the graphs 42, 44, 46, 48 of FIGS. 6A through 6D. In FIG. 6A a tire deflection estimation is made using a 20 percent error in sprung mass (Ms). In FIG. 6B a tire deflection estimation is made using a 20 percent error in suspension stiffness (Ks). In FIG. 6C the tire deflection estimation graph 46 if actual vs. estimated is seen with a 20 percent error in unsprung mass (mu). FIG. 6D shows in graph 48 the result of a 20 percent error in tire stiffness (kt). The conclusion to be drawn from the error analysis seen in FIGS. 6A through 6D is that tire deflection estimates are most affected by errors in the tire stiffness and the unsprung mass.

Figure 7A:
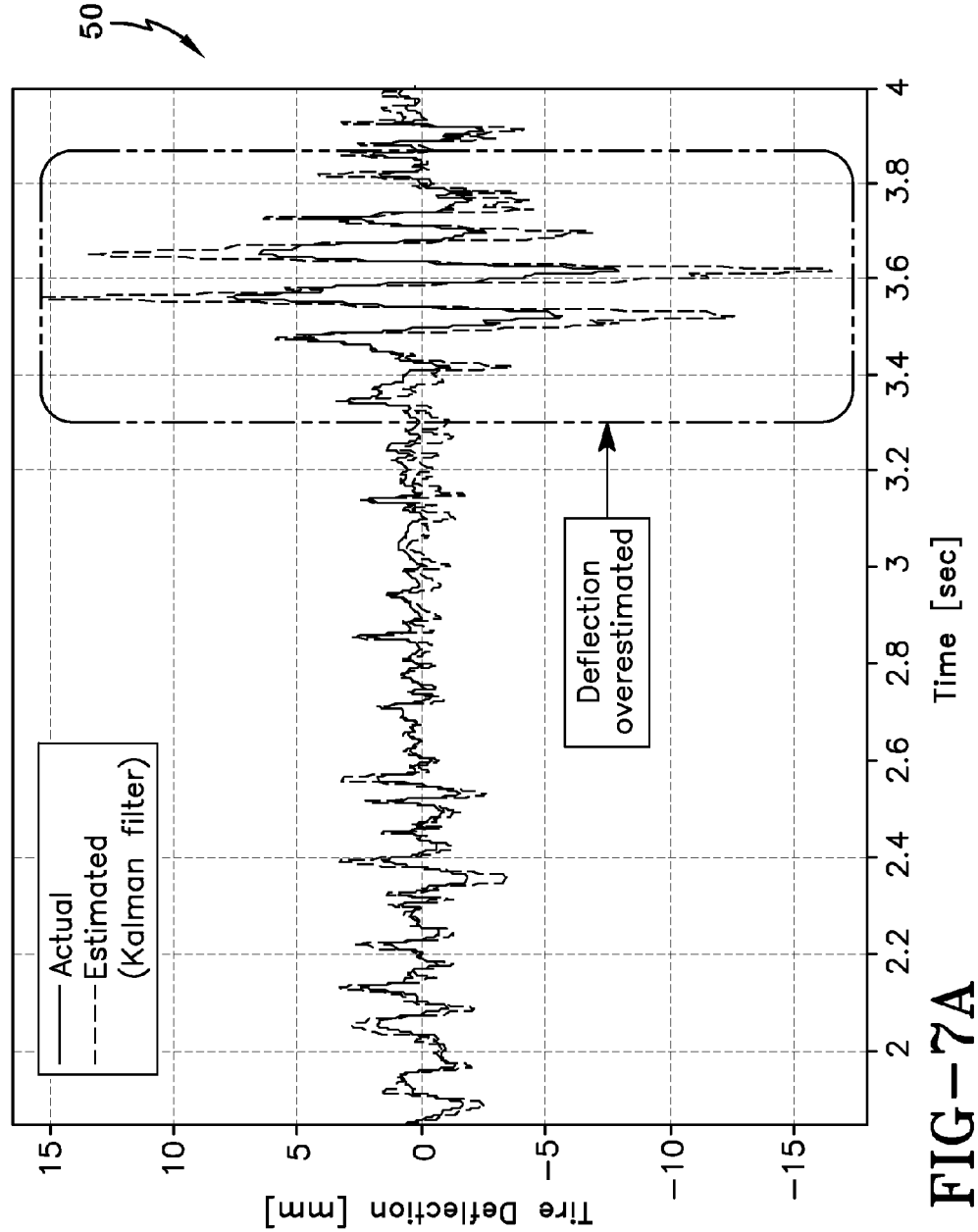

The impact of tire stiffness errors will be appreciated from FIGS. 7A and 7B graphs 50, 52. Case 1, represented in FIG. 7A, assumes a lower stiffness than actual. The deflection over estimation portion of the graph is seen in broken line. In FIG. 7B, graph 52, a Case 2 scenario is presented in which a higher stiffness than actual is assumed. Again, the outline in broken line of the graph 52 shows the extent of deflection underestimation from the stiffness assumption.

Figure 8:
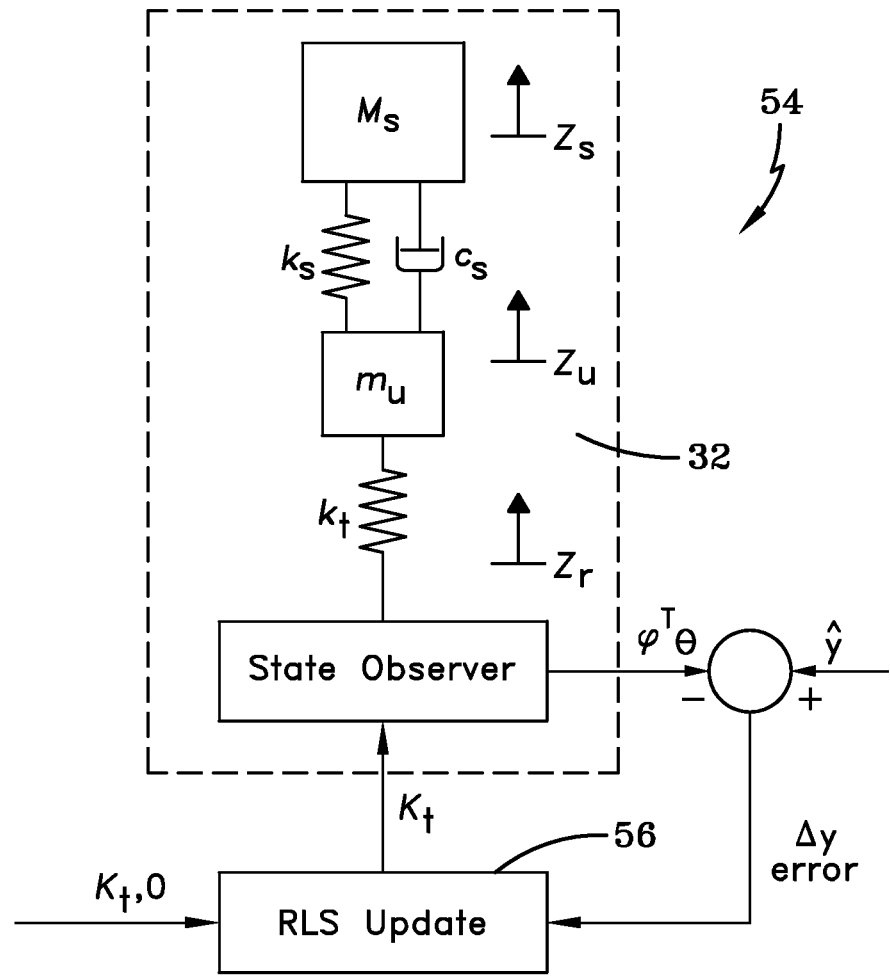
FIG. 8 is a schematic of the approach taken of running a RLS module in parallel with the observer to estimate the tire stiffness.

In order to minimize the effect of assumption error in estimating tire stiffness, the subject system employs a recursive least squares module (RLS) in parallel with the observer described above to estimate tire stiffness. In FIG. 8, a diagram 54 of the parallel approach is shown. The approach gets an updated estimate of the tire stiffness (Kt) at each new iteration of the system, whereby improving the overall observer performance. In using the RLS update 56 in parallel with the observer 32, a more accurate estimation of tire stiffness Kt is achieved and the effect of error in initial assumption is minimized.

Figure 9A:
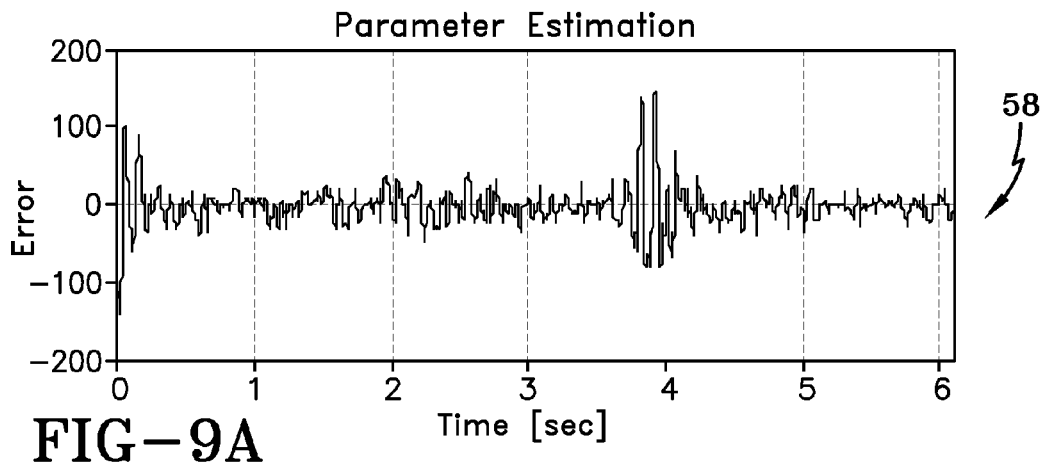
FIGS. 9A through 9C are graphs showing parameter estimation, parameter update status and tire spring rate for a Case 1: initial guess higher than actual value scenario.
Figure 9B:
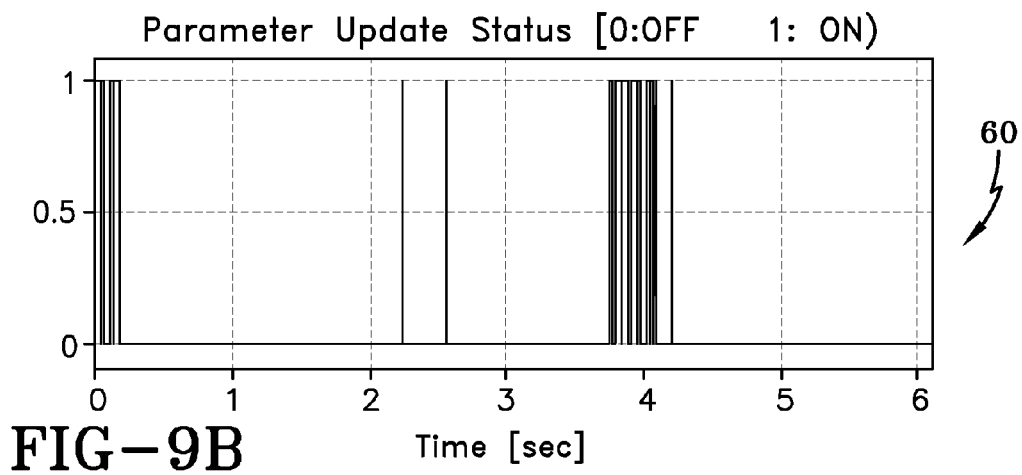
Figure 9C:
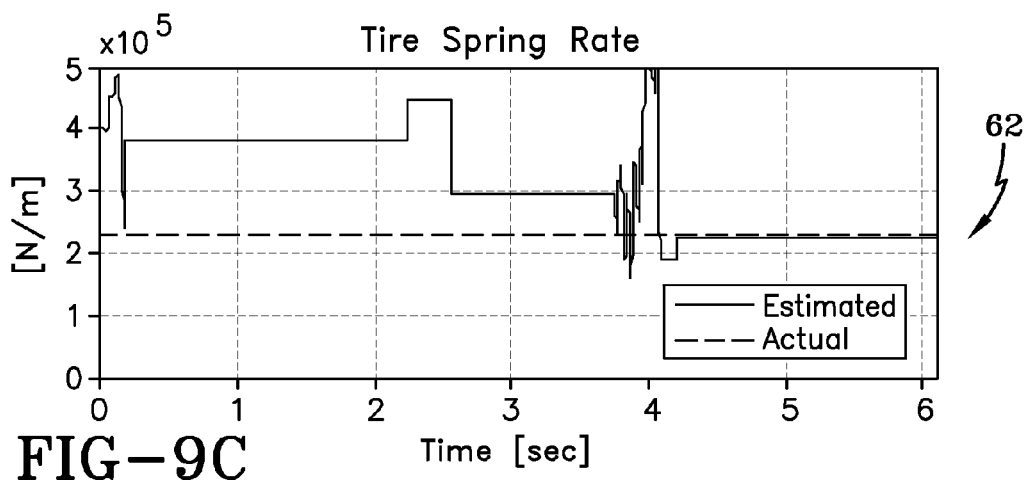
Figure 10A:
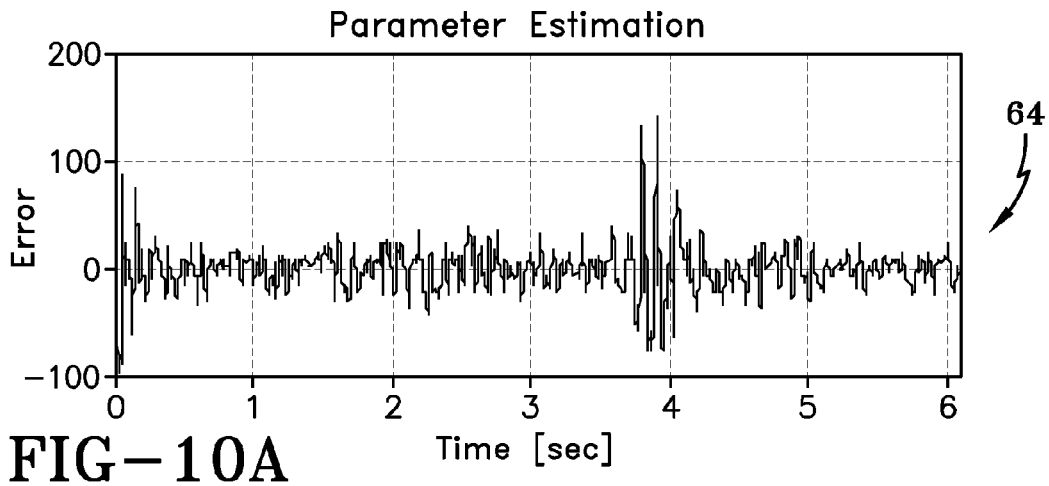
FIGS. 10A through 10C are graphs showing parameter estimation, parameter update status and tire spring rate for a Case 2: initial guess lower than actual value scenario.
Figure 10B:
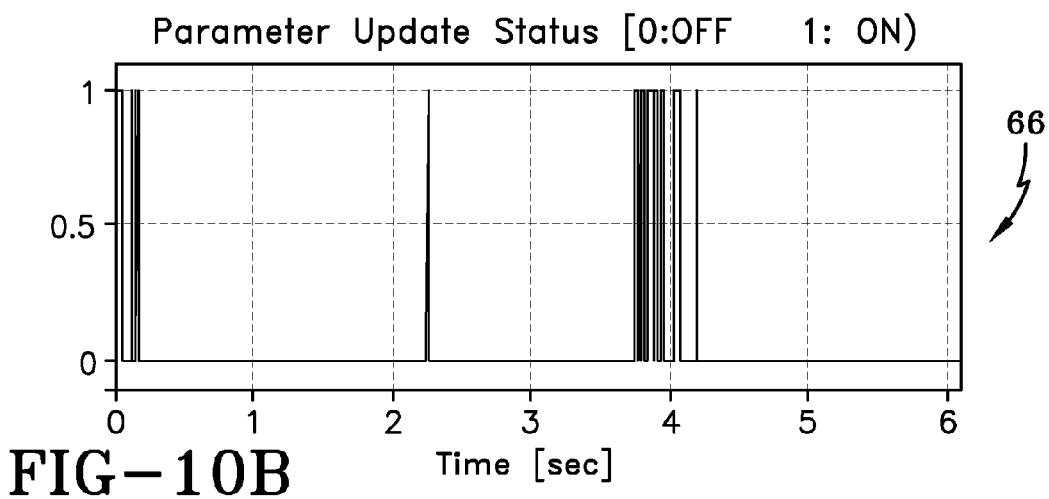
Figure 10C:
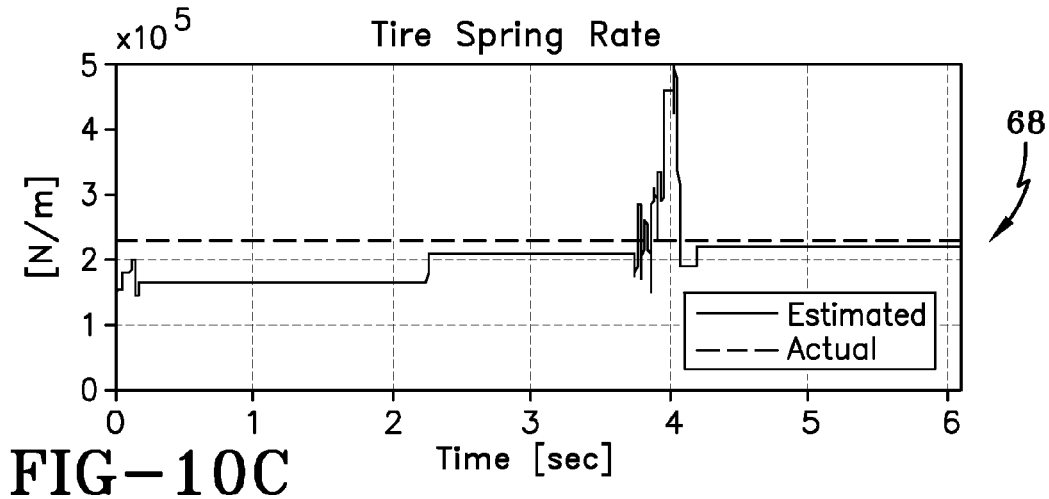

The improved estimation of tire stiffness results achieved by the parallel approach of FIG. 8 is validated by the test result graphs 58, 60, 62, 64, 66, 68 of FIGS. 9A through 9C and 10A through 10C respectively. In FIGS. 9A through 9C, an initial guess higher than actual value is made. The parameter estimation graph 58 plots error over time; the parameter update status graph 60 is generated as seen in FIG. 9B; and the resulting tire spring rate graph 62 shows improved results of estimated vs. actual after the parameter update status has been made. Similar results of actual vs. estimated are seen in graphs 64, 66, and 68 of FIGS. 10A through 10C in which the initial guess is lower than actual value. The error between actual and estimated prior to parameter updating is seen in FIG. 10C and the improved results of estimated vs. actual after parameter updated is seen.

Figure 11A:
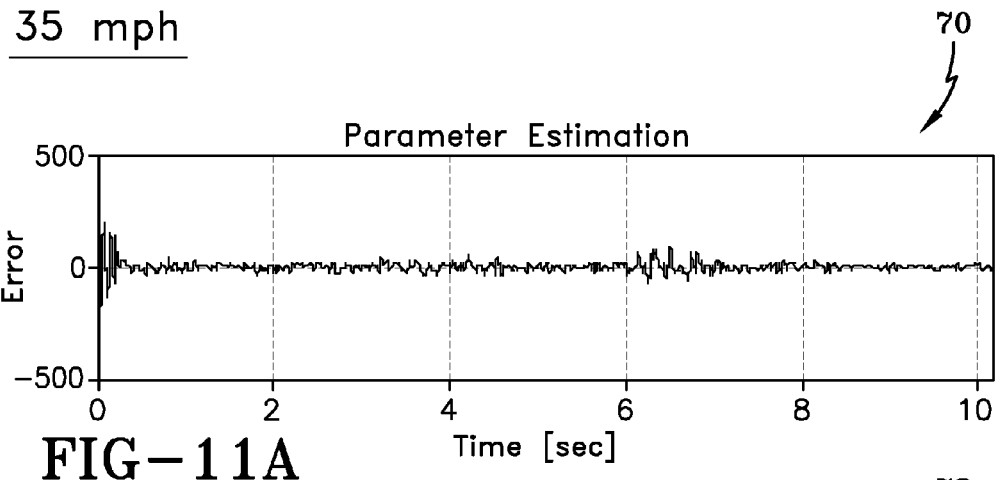
FIGS. 11A through 11C are graphs showing parameter estimation, parameter update status and tire spring rate for a first travel speed of 35 mph.
Figure 11B:
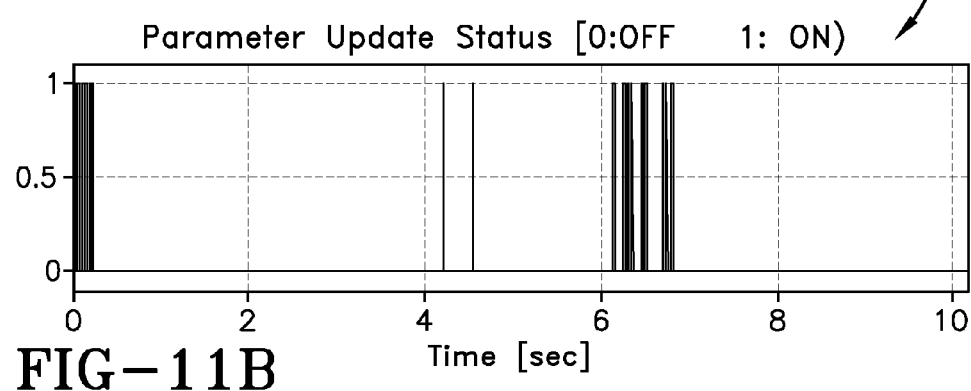
Figure 11C:
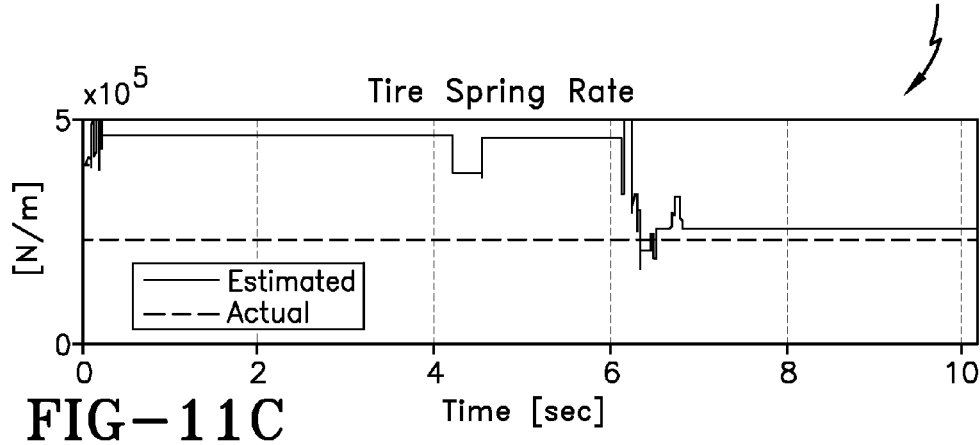
Figure 12A:
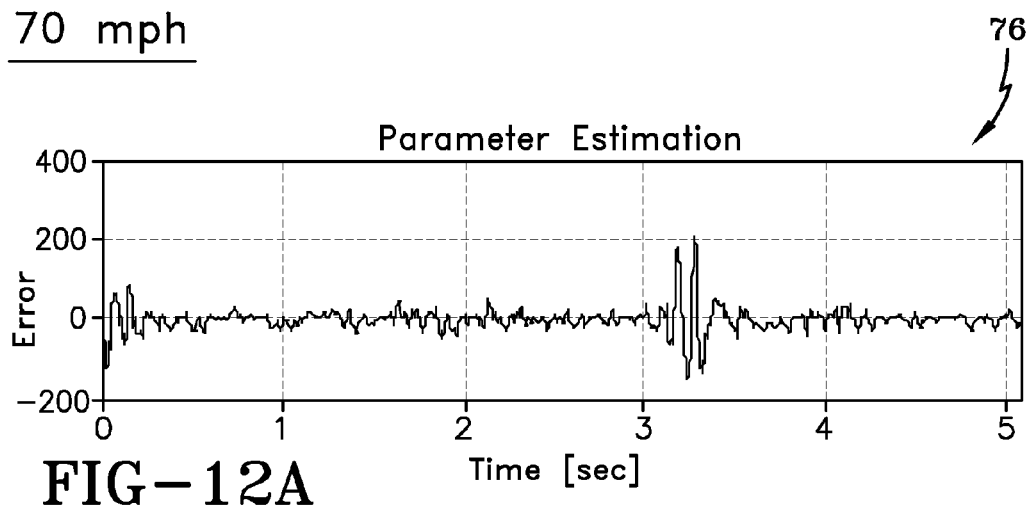
FIGS. 12A through 12C are graphs showing parameter estimation, parameter update status and tire spring rate for a first travel speed of 70 mph.
Figure 12B:
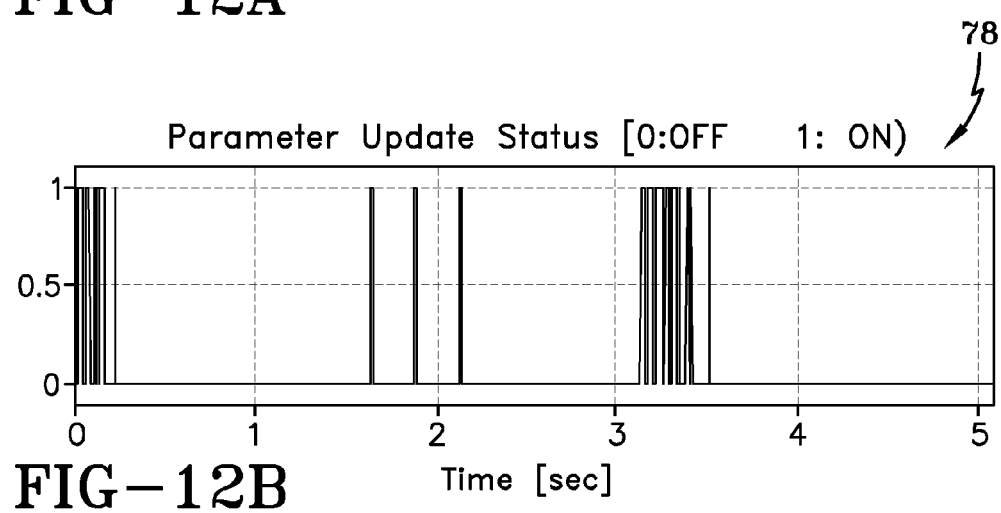
Figure 12C:
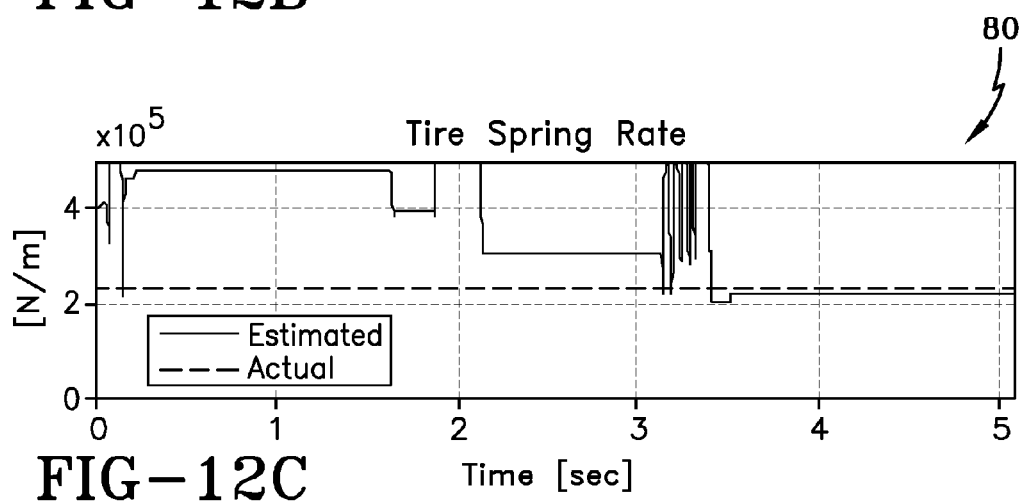

In FIGS. 11A through 11C and FIGS. 12A through 12C the effect of speed on tire stiffness estimation is shown graphically. FIGS. 11A through 11C in graphs 76, 78, 80 show a 35 mph test. The estimated vs. actual tire spring rate results are shown in graph 74 of FIG. 11C. Prior to parameter updating using the parallel RLS approach, the error between estimated and actual is significant. After parameter updating using the RLS module, convergence between estimated and actual is achieved. Likewise the graphs 76, 78, 80 in FIGS. 12A through 12C show a similar improvement from the use of a parallel RLS module a vehicle speed of 70 mph. Thus, running a RLS module in parallel with the observer achieves an updated estimate of the tire stiffness estimation and good convergence is obtained.

Figure 13:
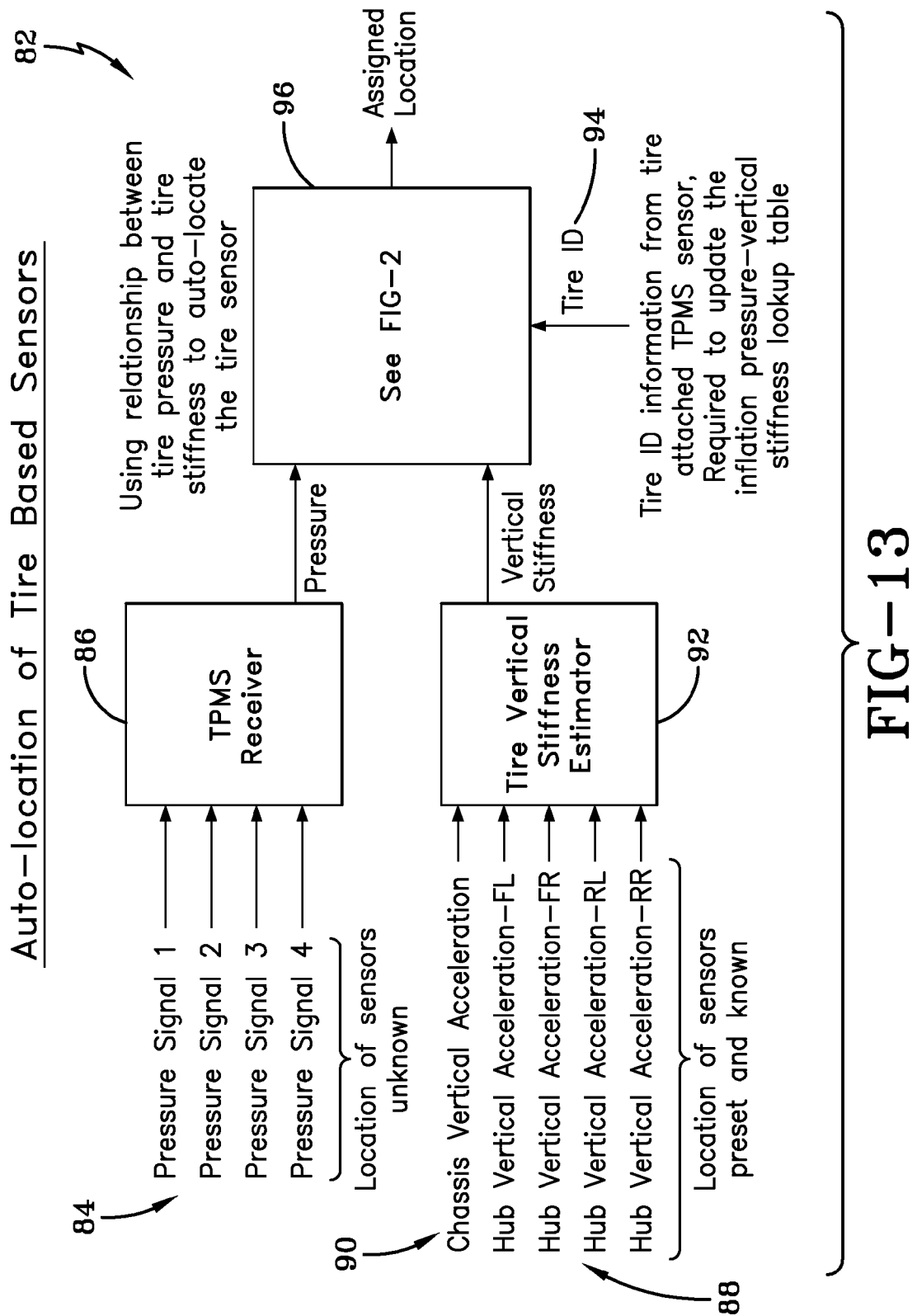
FIG. 13 is a schematic showing the system for autolocation of tire-based sensors.

The auto-location system and method is seen diagrammatically in FIG. 13 at 82. Each tire on a vehicle is equipped with a TPMS sensor for measuring tire air pressure. While four tires are represented at 84, it will be noted that the system is applicable in like manner to more or fewer tires supporting a vehicle. The pressure measurements 84 are transmitted to a TPMS receiver 86. For the purpose of illustration, it is assumed that a pressure-indicating signal is received by receiver at an unknown location on the vehicle indicating that a tire at that location has low pressure. The subject system and method's objective and purpose is to auto-locate which of the tires is experiencing the problem, i.e. pinpoint the location of the low pressure tire.

Each of wheel hubs supporting the tires is equipped with a hub vertical acceleration-measuring accelerometer 88 and a chassis-mounted vertical acceleration-measuring accelerometer 90. The location of sensors 88, 90 is preset and known. A tire vertical stiffness estimator 92, as described previously, receives as inputs the hub vertical acceleration signals from each of the hub accelerometers and the chassis vertical acceleration from the chassis accelerometer and makes an estimation of vertical stiffness for the particular tires on the vehicle using, preferably, the parallel system shown by FIG. 8. The vertical stiffness estimation is used with the pressure measurement received by TPMS receiver 86 as inputs in consulting a look-up table 96. The look-up table incorporates the relationship between tire vertical stiffness and inflation pressure, namely the linear relationship shown in FIG. 2.

Figure 2:
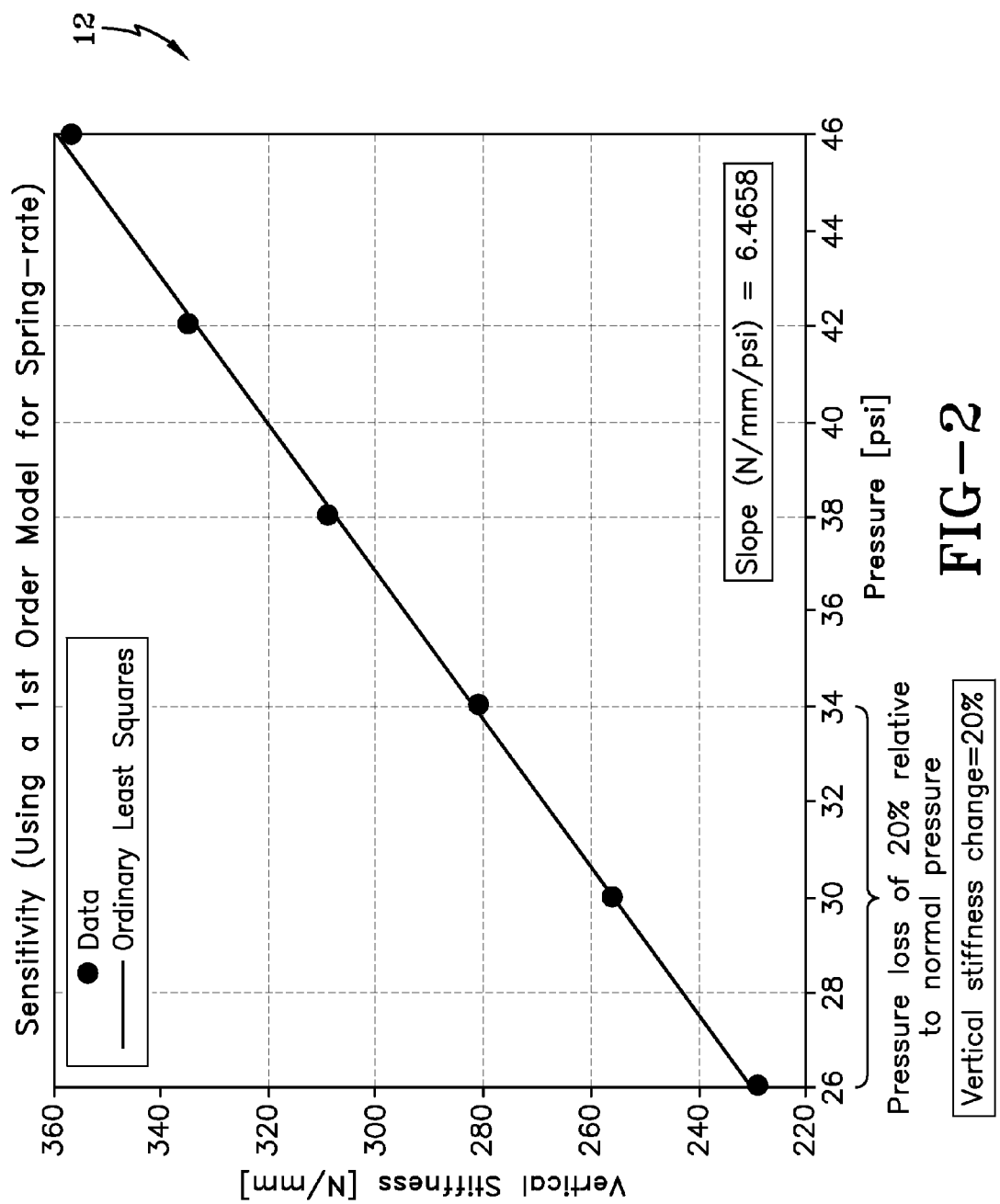
FIG. 2 is a graph of vertical stiffness vs. inflation pressure, showing sensitivity comparing experimental data to first order model for spring-rate.

The linear relationship between stiffness and inflation pressure shown in FIG. 2 and incorporated into the look-up table 96 of FIG. 13 changes depending on a tire's construction. For example, a winter tire will have a different relationship line than a summer tire The line in the graph 12 shifts for tires of differing construction type. Accordingly, the tire ID transponder attached to each tire supporting the vehicle provides the important tire identification code number from which the tire's construction type may be determined. The look-up table 96 has specific relational correlations between tire vertical stiffness and tire air pressure for tires of alternative construction types so that, knowing the tire ID code from the tire-mounted transponder, the tie construction may be ascertained and a suitable correlation line selected. The tire ID is known from the transponder mounted to each tire does not change even though the location of the tire may change on the vehicle from rotation of the tires or substitution of tires onto the vehicle.

Operation of the system proceeds as follows. With reference to FIG. 13, the tires on a vehicle are monitored for pressure on a regular basis. The pressure signals 84 from the tires at unknown locations on the vehicle are received by the TPMS receiver. In addition, the acceleration sensors 88, 90 provide acceleration measurements of the hubs and chassis on a regular basis. Location of the signal from any given hub location is known and preset. From the chassis acceleration measurement and the hub acceleration measurement (at a known hub location), a tire vertical stiffness measurement is made. The look-up table 96 is consulted to determine what a tire's pressure must be at a given (known) hub location using the calculated estimated vertical stiffness estimation at that hub location and the relational graph between tire pressure and vertical stiffness in the look-up table. If the pressure is below recommended level, a warning to the driver is warranted so that re-inflation can be initiated for the tire located at the known hub location (FL, FR, RL, or RR). The driver is thus alerted not only of the low pressure situation but which tire is low.

In addition, because of the tire ID information received from the tire at the hub location where the tire stiffness estimation is made, the tire ID can be directly used to match any low pressure readings received by the TPMS receiver 86. For example, a tire X is identified by tire ID module affixed to the tire. The receiver 86 receives a signal indicating that a tire has low pressure. From the look-up table consultation, it is determined that the tire having low pressure is located at hub Y. It is therefore known that the tire having tire ID received by receiver 86 is located at hub Y. The low pressure signal received by receiver 86 may then be compared against the low pressure found through consultation with the look-up table to see if the pressure signal reading agrees with the estimated pressure reading found from the look-up table 96. The redundancy possible from comparing estimated the low pressure magnitude from the look-up table against the actual TPMS sensor signal of pressure achieves an accurate conclusion to be drawn as to the air pressure in tire X at hub location Y.

In addition to being useful in deriving a redundant reading tire pressure in tire X above, tire ID for tire X is useful in making sure the correct relational graph is consulted in the look-up table 96. The tire ID code from tire X will determine what tire construction is present in tire X. Once that is known, the relational graph (FIG. 2) suitable for that tire construction will be employed. A summer tire, for example, will have a different relational graph than a winter tire because of construction differences.

It will be further apparent that once the subject system performs an iteration through all of the tires on a vehicle at all of the known tire hub locations, the location of each tire may be ascertained and stored against the tire ID code for that tire. Should the tire be removed and replaced, that act will be detected and the system may be updated to the new tire ID code.

It will be appreciated that the tire vertical stiffness estimation by estimator 92 is made solely from hub vertical acceleration and chassis vertical acceleration measurements independent of any knowledge of road surface elevation or undulation. Moreover, the use of the parallel RLS update 56 with the observer 54 (FIG. 8) improves the accuracy of the tire stiffness estimation. The hub locations are known and fixed within the system. Should the tires be relocated on the vehicle from one hub location to a new hub location, the system will reassign the tire to that new hub location through the use of the tire ID codes of the tires and the hub locations determined from the look-up table for those tires. Each tire will retain its specific tire stiffness to tire pressure correlation at the identified hub location. The look-up table will identify any change in hub location of the tire from the estimation process described above, using known the hub accelerometer locations. When the system receives the vertical stiffness estimation from the new hub location, the system will associate the new hub location with the new tire location and such location will there forward be considered the "assigned location".

From the foregoing it will be appreciated that the subject system provides a tire sensor auto-locating system for auto-location of a tire-based air pressure sensor at any tire location on a vehicle. A hub acceleration sensor is mounted to make a hub vertical acceleration measurement at a preset and known location on the vehicle for a respective one of the wheel hubs and a chassis acceleration sensor is mounted to a chassis of the vehicle to make a chassis vertical acceleration measurement for the vehicle chassis. An estimator model is employed to derive a tire vertical stiffness estimation from the hub vertical acceleration measurements and the chassis vertical acceleration measurement. A look-up table correlates tire vertical stiffness estimation to air pressure and from the look-up table an assigned location of the tire sensor is made through a correlation between the tire measured air pressure of the one tire and the tire vertical stiffness estimation of the one tire.

The look-up table correlates variation of tire vertical stiffness with inflation subject to a tire construction-specific identification and each of the vehicle tires carries a respective tire identification transponder to provide a coded tire identification used to make a tire construction specific correlation of tire vertical stiffnesses with air pressure in the look-up table. In addition to tire construction, the graph of FIG. 2 may be changed due to tire make (manufacturer) or tire type and the tire ID information can be used to update the look-up table to incorporate such factors that affect the pressure to vertical stiffness relationship.

It will further be noted that the tire vertical stiffness estimation is made from a tire deflection observer using the hub vertical acceleration measurements and the chassis vertical acceleration measurement independently of any road surface variation input. The system thus is capable of functioning independently of any road surface variation.

Finally, the recursive least square parameter estimator is provided to operate in parallel with the tire deflection observer to estimate the tire vertical stiffness in a robust and accurate manner.

Thus, the subject system and method is directed towards determining the location of tire attached sensors by correlating pressure information from the tire attached sensor with the tire spring rate information estimated using a model based observer using information from sensors on the vehicle. The vehicle sensors used: chassis and hub vertical acceleration signals are used in conjunction with a model based observer based on a Kalman filter supported by a recursive least square parameter estimator to give robust and accurate estimates of the tire vertical stiffness (spring rate). The attached tire sensor consists of at least a pressure sensor among other possible sensors such as a strain sensor, accelerometer, thermocouple etc. The relationship between tire pressure and tire vertical stiffness (i.e. spring rate) is used to auto-locate the tire attached sensor. Tire ID information from the tire attached sensor is used to update the inflation pressure-vertical stiffness look-up table to account for variations due to changes in tire construction, make, type, etc.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tire sensor locating system for auto-location of tire-based sensors comprising:
   a vehicle supported by a plurality of vehicle tires, each of the tires mounted to a wheel hub and each of the tires having a respective tire-based sensor operable to measure a tire air pressure;
   a receiver for receiving from one of the tire sensors a measured tire air pressure at an un-identified sensor location on the vehicle;
   a plurality of hub acceleration sensors mounted to the vehicle, each hub acceleration sensor operable to make a hub vertical acceleration measurement at a preset and known location on the vehicle for a respective one of the wheel hubs;
   a chassis acceleration sensor mounted to a chassis of the vehicle operable to make a chassis vertical acceleration measurement for the vehicle chassis;
   an estimator model for deriving a tire vertical stiffness estimation from the hub vertical acceleration measurements and the chassis vertical acceleration measurement;
   a look-up table correlating tire vertical stiffness estimation against measured air pressure;
   a processor operable to consult the look-up table and identify an assigned location of the one tire sensor from a correlation between the tire measured air pressure of the one tire and the tire vertical stiffness estimation of the one tire.

2. The tire sensor locating system of claim 1, wherein further comprising:
   a plurality of tire identification transponders, each transponder affixed respectively to a respective vehicle tires, the transponder operable to transmit a coded tire identification; and
   wherein the look-up table is updated by receipt of the transmitted coded tire identification to provide a tire construction-specific correlation between air pressure and tire vertical stiffness.

3. The tire sensor locating system of claim 1, wherein the look-up table operably correlates variation of tire vertical stiffness with inflation subject to a tire-specific identification.

4. The tire sensor locating system of claim 3, wherein each of the plurality of tires carries a respective tire identification transponder operable to transmit a coded tire identification used in making a tire-specific correlation of tire vertical stiffnesses with inflation from the look-up table.

5. The tire sensor locating system of claim 1, wherein the tire vertical stiffness estimation is made from a tire deflection observer using the hub vertical acceleration measurements and the chassis vertical acceleration measurement independently of any road surface variation.

6. The tire sensor locating system of claim 5, wherein the tire deflection observer is based on a Kalman filter.

7. The tire sensor locating system of claim 5, wherein further comprising a recursive least square parameter estimator operating in parallel with the tire deflection observer to estimate the tire vertical stiffness.

8. A tire sensor locating system for auto-location of tire-based sensors comprising:
   a vehicle supported by a plurality of vehicle tires, each of the tires mounted to a wheel hub and each of the tires having a respective tire-based sensor operable to measure a tire air pressure;
   a receiver for receiving from one of the tire sensors a measured tire air pressure at an un-identified sensor location on the vehicle;
   a plurality of hub acceleration sensors mounted to the vehicle, each hub acceleration sensor operable to make a hub vertical acceleration measurement at a preset and known location on the vehicle for a respective one of the wheel hubs;
   a chassis acceleration sensor mounted to a chassis of the vehicle operable to make a chassis vertical acceleration measurement for the vehicle chassis;
   an estimator model for deriving a tire vertical stiffness estimation from the hub vertical acceleration measurements and the chassis vertical acceleration measurement, wherein the estimator model comprises a tire deflection observer using the hub vertical acceleration measurements and the chassis vertical acceleration measurement independently of road surface variation;
   a look-up table correlating tire vertical stiffness estimation against measured air pressure;
   a processor receiving as inputs the tire vertical stiffness estimation and the tire measured air pressure, the processor operable to consult the look-up table and identify an assigned location of the one tire sensor from a correlation between the tire measured air pressure and the tire vertical stiffness estimation.

9. The tire sensor locating system of claim 8, wherein the tire deflection observer is based on a Kalman filter.

10. The tire sensor locating system of claim 8, wherein the estimator model further comprising a recursive least square parameter estimator operating in parallel with the tire deflection observer to estimate the tire vertical stiffness.

11. The tire sensor locating system of claim 10, wherein look-up table operably correlates variation of tire vertical stiffness with inflation subject to a tire-specific identification.

12. The tire sensor locating system of claim 11, wherein each of the plurality of tires carries a respective tire identification transponder operable to transmit a coded tire identification used in making a tire-specific correlation of tire vertical stiffnesses with inflation from the look-up table.

13. A method for auto-location of tire-based sensors for a vehicle supported by a plurality of vehicle tires, each of the tires mounted to a wheel hub and each of the tires having a respective tire-based sensor operable to measure a tire air pressure, the method comprising:
   receiving from one of the tire sensors a tire measured air pressure signal at an un-identified tire location on the vehicle;
   mounting a plurality of hub acceleration sensors to the vehicle, each hub acceleration sensor operable to make a hub vertical acceleration measurement at a preset and known location on the vehicle for a respective one of the wheel hubs;

mounting a chassis acceleration sensor to a chassis of the vehicle operable to make a chassis vertical acceleration measurement for the vehicle chassis;

deploying an estimator model for deriving a tire vertical stiffness estimation from the hub vertical acceleration measurements and the chassis vertical acceleration measurement;

applying a look-up table correlating tire vertical stiffness estimation against measured air pressure;

using as inputs the tire vertical stiffness estimation and the tire measured air pressure to consult the look-up table and identify an assigned location of the tire from a correlation between the tire measured air pressure and the tire vertical stiffness estimation.

14. The method for auto-location of tire-based sensors of claim 13, further comprising:

affixing a plurality of tire identification transponders to a respective vehicle tire, the transponder operable to transmit a coded tire identification; and updating the look-up table by the transmitted coded tire identification to provide a tire-specific correlation between air pressure and tire vertical stiffness.

15. The method for auto-location of tire-based sensors of claim 13, further comprising correlating variation of tire vertical stiffness with inflation subject to a tire-specific identification.

16. The method for auto-location of tire-based sensors of claim 15, further comprising:

mounting to each of the plurality of tires a respective tire identification transponder operable to transmit a coded tire identification;

using the coded tire identification in making a tire-specific correlation of tire vertical stiffnesses with air pressure from the look-up table.

17. The method for auto-location of tire-based sensors of claim 16, further comprising employing a tire deflection observer to make the tire vertical stiffness estimation from the hub vertical acceleration measurements and the chassis vertical acceleration measurement independently of road surface variation.

18. The method for auto-location of tire-based sensors of claim 17, further comprising basing the tire deflection observer is based on a Kalman filter.

19. The method for auto-location of tire-based sensors of claim 18, further comprising using a recursive least square parameter estimator in parallel with the tire deflection observer to estimate the tire vertical stiffness.

* * * * *